United States Patent [19]

Przytulla et al.

[11] 4,378,328
[45] Mar. 29, 1983

[54] METHOD FOR MAKING CHIME STRUCTURE FOR BLOW MOLDED HOLLOW MEMBER

[75] Inventors: Dietmar Przytulla, Sindorf; Harald Feuerherm, Troisdorf, both of Fed. Rep. of Germany

[73] Assignee: Mauser-Werke GmbH, Bruhl, Fed. Rep. of Germany

[21] Appl. No.: 130,352

[22] Filed: Mar. 14, 1980

[30] Foreign Application Priority Data

Apr. 12, 1979 [DE] Fed. Rep. of Germany ....... 2914938

[51] Int. Cl.³ .................... B29C 17/07; B29C 17/10
[52] U.S. Cl. .................................. 264/534; 220/5 R; 220/72; 220/74; 220/85 K; 264/536; 425/525
[58] Field of Search ............... 264/534, 536, 296; 425/525, 527; 220/5 R, 85 K, 72, 73, 74

[56] References Cited

U.S. PATENT DOCUMENTS

| | | | |
|---|---|---|---|
| 4,022,345 | 5/1977 | Butz | 220/73 X |
| 4,036,926 | 7/1977 | Chang | 425/525 X |
| 4,117,062 | 9/1978 | Uhlig | 425/525 X |
| 4,228,122 | 10/1980 | Hammes | 425/525 X |
| 4,228,916 | 10/1980 | Weingardt | 220/73 X |

FOREIGN PATENT DOCUMENTS

| | | | |
|---|---|---|---|
| 911228 | 11/1962 | United Kingdom | 264/536 |
| 1001672 | 8/1965 | United Kingdom | 264/534 |

*Primary Examiner*—Jan H. Silbaugh
*Attorney, Agent, or Firm*—Pennie & Edmonds

[57] ABSTRACT

The invention sets out a method and apparatus of forming a chime projecting radially outwardly of a blow molded hollow member. The chime is formed immediately after the blow molding of the hollow member by forming a radially outwardly projecting channel-shaped part in the side wall of the hollow member. The surfaces of the channel-shaped part are moved toward each other to form a welded connection at the radially inner end of the channel-shaped part. The movement of the channel-shaped part to form the chime is effected by telescoping slides which move axially at different stroke speeds and at different stroke lengths. The radially inwardly most disposed slide moves farthest and faster so as to produce a rolling movement of the channel-shaped part as the chime is formed. The resulting chime is integrally formed from the material of the hollow member and includes at least an outer wall extending circumferentially around the hollow member and a side wall to which the outer wall is welded at its inner radial end.

13 Claims, 14 Drawing Figures

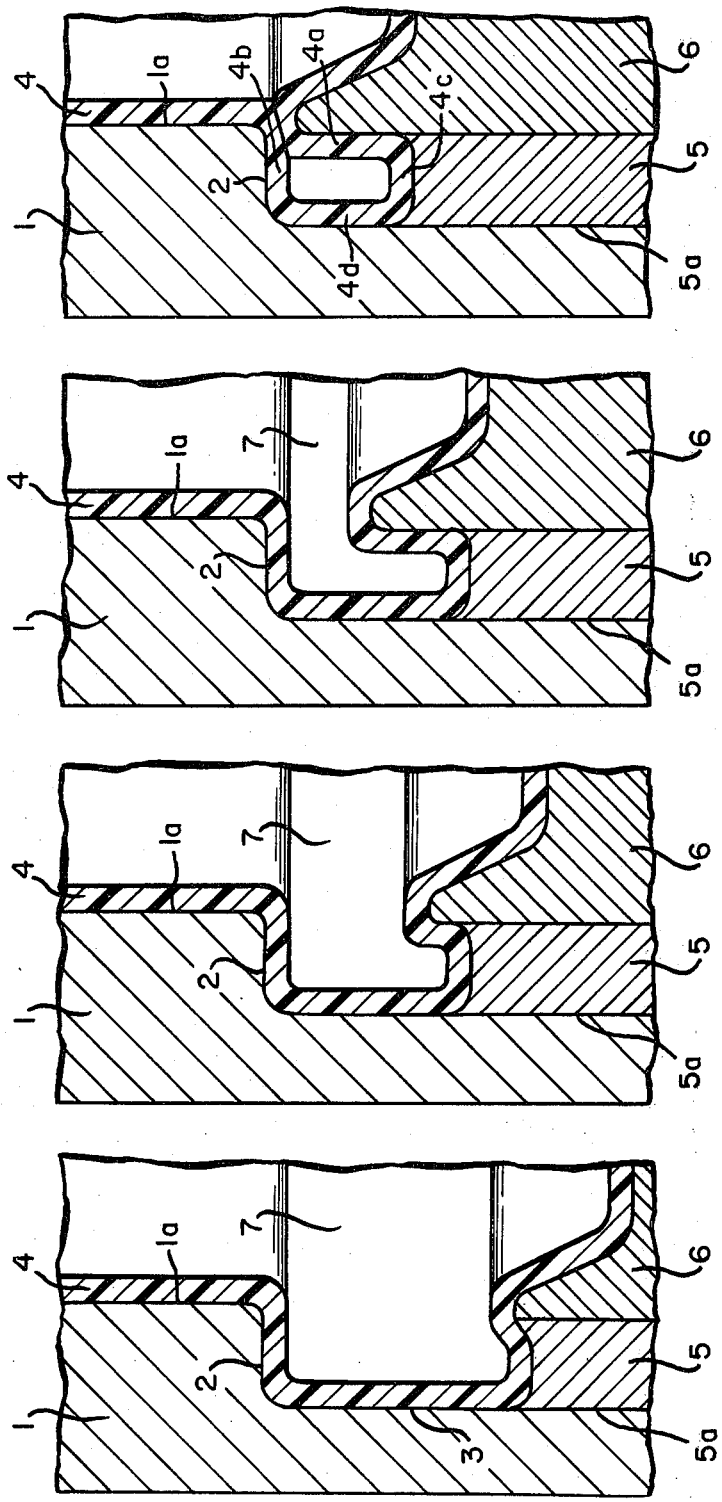

METHOD FOR MAKING CHIME STRUCTURE FOR BLOW MOLDED HOLLOW MEMBER

TECHNICAL FIELD

This invention relates to a method and apparatus of making a chime projecting radially outwardly from a blow molded hollow member and to the construction of the chime formed thereby wherein the material of the chime is all contained in the boundary of the chime and not formed inwardly of the hollow member.

BACKGROUND ART

In producing blow molded hollow members of thermoplastic material such as large drums, it is desirable to form chimes projecting radially outwardly of the hollow member adjacent each end thereof. These chimes facilitate handling, rolling and hoisting of the hollow member. With hollow drums blow molded from thermoplastic material, it is technically difficult to separately prepare top and bottom chime members. Accordingly, blow molded drums have been initially blow molded from a parison with a radially outwardly projecting annular channel-shaped part. The end members of the mold parts in which the blow molding operation occurs have been constructed to move axially so as to manipulate the material of the channel-shaped part into the shape of a chime. A mold construction of this type is discussed in allowed copending application Ser. No. 884,397 now U.S. Pat. No. 4,228,122 issued Oct. 14, 1980.

A disadvantage of this type of structure resides in the tendency of the material in the channel-shaped part to be forced inwardly of the hollow drum member during forming of the chime. This is a result of the compressive movement of the mold parts on the plastic material of the channel-shaped part and it causes the material to fold over on itself and form several layers one adhering to the other. Also, in the vicinity of the vertical side seams of the mold halves where the wall of the blow molded member is of increased thickness, the excess material tends to bulge into the interior of the hollow member during formation of the chime. As the material cools, different shrinkage tensions occur as a result of differential material accumulations, to which are added the tensions in the sandwiched layers. In the use of such a drum member, cracks can develop at these points.

DISCLOSURE OF THE INVENTION

In accordance with the teachings of the present invention, the disadvantages of the chime structures as described above are avoided by controlling the movement of the material in the channel-shaped part of the blow molded hollow member so as to avoid compressive forces that would force the material inwardly of the hollow member. In particular, the material of the blow molded, channel-shaped part is moved axially by multiple slides to effect a continuous backward rolling movement of the material and a welding of the material together at a single radially inwardly most portion of the chime.

The slides are formed in the end parts of the mold structure and are disposed in telescoping relation with each other. The radially inwardly most slide moves through a stroke length and at a rate of movement which are greater than the stroke length and rate of movement of the other slide member. This movement effects the continuous folding back or rolling of the material of the channel-shaped part with the material which moves the farthest axially being that which is disposed radially inwardly most in overlying relation with the inner slide. Upon completion of the stroke of the slides, the radially inwardly most disposed material is then welded to the material on the other side of the channel-shaped part which is axially aligned therewith.

All these measures have the advantage that the former compressive movement is replaced by a backfolding or rolling movement. The chime material on the vertical wall surfaces of the channel-shaped part performs virtually a continuous rolling movement which prevents the formation of foldovers resulting in layering with its harmful consequences. The excess material which has gathered in the vertical seam areas of the mold no longer bulges into the interior of the hollow member but collects at these points in the interior of the hollow chime and thus is kept away from the single welded seam.

Furthermore, the parison can be expanded by air fully into the mold recess to form the channel-shaped part while the slides remain open as opposed to the former methods where the sliding movement began during the inflation. The final inflation in accordance with the method of the invention simplifies the adjustment of the movement of the sliding parts. Furthermore, a chime configuration results which has an all-over even outer contour.

BRIEF DESCRIPTION OF THE DRAWINGS

FIGS. 1-4 show sequential stages of movement, in partial longitudinal section, of the lower left portion of a blow mold having multi-part slides and the expanded parison contained therein;

DETAILED DESCRIPTION OF THE INVENTION

Figure 7:
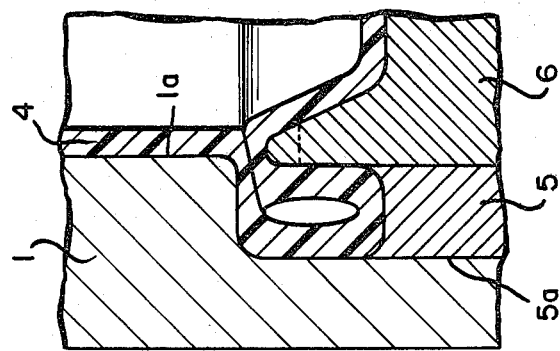
FIGS. 5-7 show the internal cross-sectional configuration of the chime at different circumferential locations, beginning from the thinnest wall thickness area of the hollow member and extending to location of the vertical seams of the mold.

In FIGS. 1-4, the left half of the side member of the blow mold is shown at 1 with a first inner surface 1i a extending in the axial direction of the lateral side surface of the hollow member 4. The sliding die parts or slides of one end of the blow mold are shown at 5 and 6. The slides are movable with respect to one another and guided telescopingly one on the other at different rates of movement and different stroke lengths. The channel-shaped recess 7 in the mold which forms the channel-shaped part in the blown parison is defined by the fixed horizontal shoulder 2, the top surfaces of the movable slides 5 and 6 and the vertical wall 3 of the side member of the mold half.

The vertical wall 3 defines a second inner surface positioned radially outwardly from the first inner surface 1a. This surface which also extends in an axial direction of the lateral side surface of the hollow member is disposed at the radially outer edge of the shoulder 2. The slide 5 has a first surface 5a disposed in sliding contact with the surface of the vertical wall 3 of the side member 1 and is movable toward the shoulder 2 at a first speed. The second slide 6 has its outer surface in sliding contact with the inner surface of the first slide and is also movable toward the shoulder but its movement is at a second speed greater than the first speed. In FIG. 1, the parison is in its fully inflated condition and lying against all of the surface defining the recess 7.

In forming the chime, the slides 5 and 6 are moved axially towards the fixed surface 2 with slide 5 traveling a shorter distance than slide 6 and being operated at no more than half of the rate of movement of slide 6. As this takes place, the parison material 4 in contact with the vertical wall 3 and the top surfaces of the slides 5 and 6 performs a continual rolling movement. The radially inwardly most disposed portion of parison 4 which is moved the farthest by the slide 6 is fused with the material in contact with the horizontal wall surface 2 of the mold recess 7 when the slide 6 is in its final chime forming position shown in FIG. 4. At this position, the simultaneously moving slide 5 traveling the shorter distance has completed its movement, so that a closed hollow chime is formed with only one weld.

In construction, the completed chime as shown in FIG. 4 includes a first circumferentially extending wall 4a spaced radially outwardly of the side wall of the hollow member. The chime also includes a side wall 4b extending radially outwardly of the side wall of the hollow member and also radially outwardly of the wall 4a. This side wall is disposed at one axial end of the wall 4a with its radial inner portion integrally welded to the one axial end of the wall 4a. An additional side wall 4c and outer wall 4d complete the formation of the chime having a hollow interior. All the walls of the chime are formed from the material of the original inflated parison and in particular from the channel-shaped part of the inflated parison.

Figure 6:
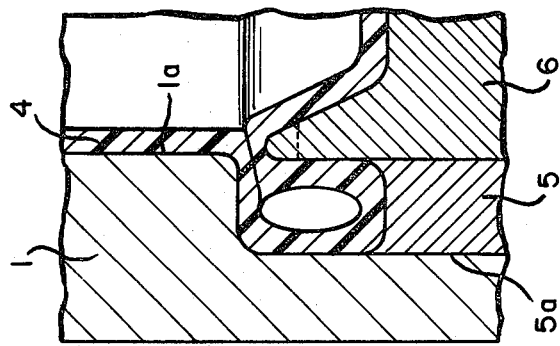
Figure 5:
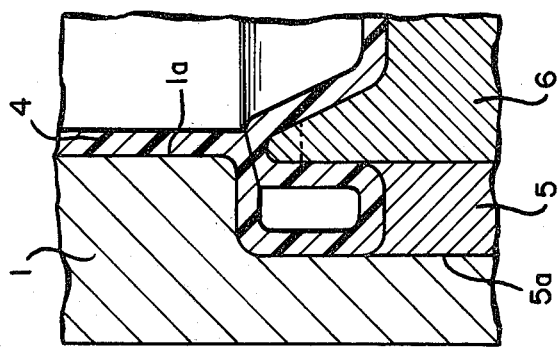

FIGS. 5–7 show the slides 5 and 6 in their final chime forming position at different points about the circumference of the hollow member. The difference in the amount of material filling the interior of the chime is to be noted. In FIG. 5 the minimum material thickness can be seen, which amounts to that of the parison's circumferential thickness farthest from the vertical seam area of the mold halves. Here the material of the parison has traveled the longest stretch distance during inflation of the parison by the blow molding operation. FIG. 7 shows the chime at a location spaced circumferentially by 90° from the location of FIG. 5 while FIG. 6 shows an intermediate circumferential position. FIG. 7 is thus a view at the vertical seam area of the mold where there is a maximum wall thickness of the parison since at this area the shortest stretch distances are covered in the inflation of the gripped parison. The excess material increasingly fills the hollow interior of the chime which does not change its external shape.

Figure 8:
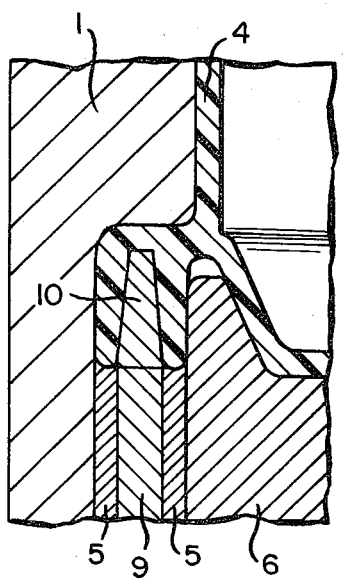
FIGS. 8-9 show chimes that are open on one side and the slide structure of the mold for forming these configurations.
Figure 9:
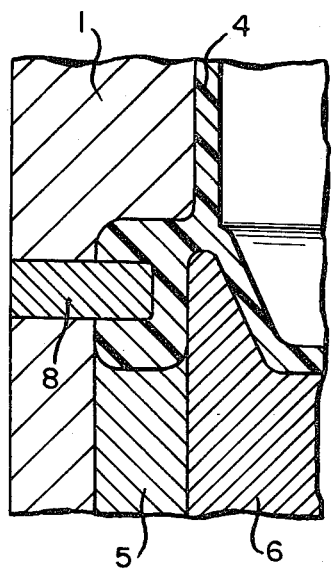

FIGS. 8 and 9 show alternative embodiments of the chime configuration. In FIG. 8 an additional slide 9 is guided within slide 5 and has projections 10 distributed at intervals along its circumference. With this construction, indentations are formed in the hollow chime at spaced locations about its circumference. These indentations extend longitudinally of the hollow member.

In FIG. 9, radially inwardly directed segment slides 8 are introduced into the hollow chime, so that lateral annular indentations are formed therein. It is also possible, however, to make chimes that are open all along one side by constructing the slides accordingly.

Figure 10:
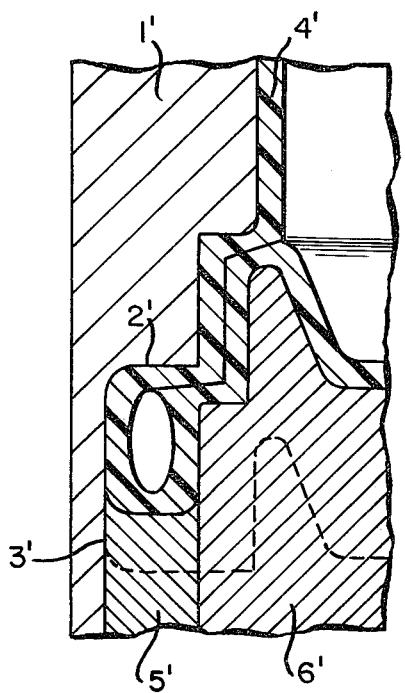
FIG. 10 shows the cross-section of a chime having a stepped portion.

In FIG. 10, the mold parts have been modified to form a chime having a stepped configuration connecting it to the hollow member. In FIG. 10, the parts of the mold similar to the parts shown in FIG. 1 have been given like reference numerals followed by the suffix prime ('). The movement of the slides 5' and 6' is as described with respect to the slides 5 and 6 of the embodiment of FIG. 1.

Figure 11:
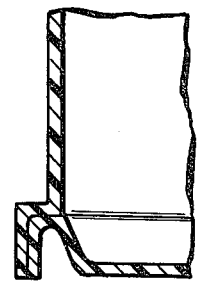
FIG. 11 shows the hollow member of FIG. 10 after removal from the blow mold with the hollow chime cut off in a plane coaxial with the hollow member.
Figure 12:
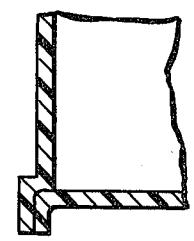
FIG. 12 shows the hollow member of FIG. 10 in which the plane of severance of the severed hollow chime is perpendicular to the axis of the hollow member.

The hollow member with the chime as shown in FIG. 10 can be used with the stepped configuration. Alternatively, the chime can be cut off either along the plane coaxial with the hollow member or laterally thereof. These two configurations are shown respectively in FIGS. 11 and 12.

Figure 13:
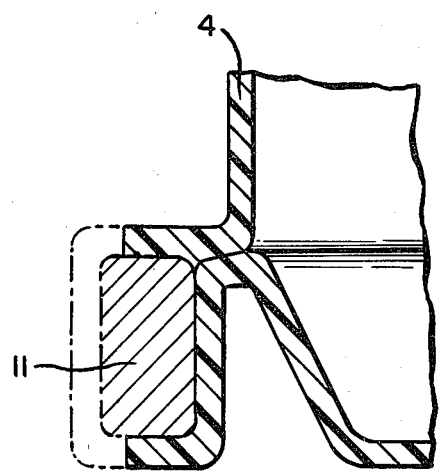
FIG. 13 shows a cut-open hollow chime containing an inserted hoop.

FIG. 13 shows a detailed cross-section of a hollow chime whose outer wall section has been cut away after formation. The annular groove thus formed is suitable for the accommodation of an inlay ring 11.

Figure 14:
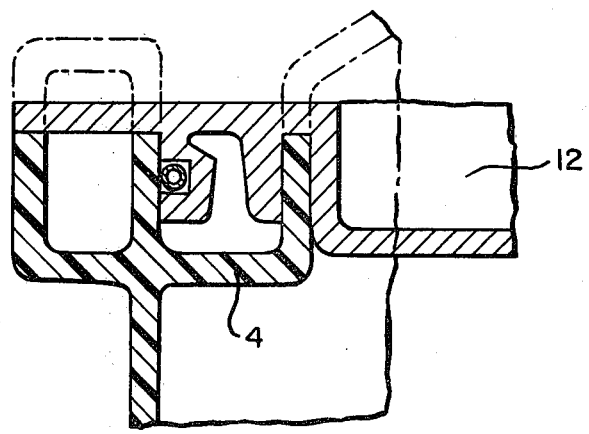
FIG. 14 shows a fragmentary hollow member with the chime cut open and the top of the hollow member removed and with a cover inserted into the opening thus created.

In the case of the embodiment in FIG. 14, the top surfaces of the hollow chime and the top of the hollow member have been cut away in one plane. Into the opening thus formed there is inserted a removable cover 12.

The possibility is offered of injecting liquids or foams into the hollow interior of a closed chime for the purpose of increasing the stability of the chime.

We claim:
1. In the method of producing a chime projecting radially outwardly on a blow-molded hollow member of thermoplastic material by forming the chime directly from the still hot hollow member by actuation of axially movable slide means toward an axially aligned fixed mold surface of a divided blow mold after the two mold halves have been brought together and after a plastic parison gripped between the mold halves has been inflated to a given shape to form the hollow member with a radially outwardly projecting annular channel-shaped part having one side wall thereof lying against the fixed mold surface, its other side wall lying against the slide means and the bottom outer wall lying against a radially outwardly disposed axial surface of the mold, by moving the slide means axially of the hollow member toward the fixed mold surface, the improvement characterized in that:
(a) the slide means, which are defined by multi-part first and second slides telescoped on one another, are moved axially in supporting relationship with the other side wall of the channel-shaped part through different stroke lengths and at different stroke speeds; and
(b) with the first radially inwardly most disposed slide being moved farther and faster than the second radially outwardly most disposed slide to produce a rolling movement of the material of the channel-shaped part with the radially inwardly most disposed material thereof moving farthest and being welded to the material of the channel-shaped part lying on the fixed mold surface.

2. The improvement in the method according to claim 1 characterized in that:
   (a) the second slide is moved at no more than half of the stroke speed of the first slide.

3. The improvement in the method according to either of claims 1 or 2 characterized in that:
   (a) the chime is formed with a hollow interior.

4. The improvement in the method according to claim 3 further characterized by:
   (a) simultaneously forming said chime adjacent both ends of the hollow member.

5. In the method of producing a chime projecting radially outwardly on a blow molded hollow member of thermoplastic material immediately after the forming of the hollow member in a molding apparatus with end walls and a side wall of the hollow member having a radially outwardly projecting annular channel-shaped part extending circumferentially around the hollow member and defined by a radially outwardly spaced outer wall and two axially spaced connecting side walls connecting the axially spaced ends of the outer wall to the side wall of the hollow member, the improvement characterized by:
   (a) moving the radially inner end of one of the connecting side walls axially toward and into contact with the aligned radial inner end of the other connecting side wall at a first speed;
   (b) simultaneously, and independently of the radial inner end of the one connecting side wall supporting and moving the adjacent portion of the remaining part of the one connecting side wall toward the other connecting side wall at a second speed less than said first speed; and
   (c) pressing the contacting radial inner ends of the connecting side walls against each other to weld them together to form said radially outwardly projecting chime.

6. The improvement in the method according to claims 5 further characterized by:
   (a) moving the adjacent portion of the remaining part of the one connecting side wall at a speed no greater than half the speed of movement of the radial inner end of the one connecting side wall.

7. The improvement in the method according to claim 5 characterized in that:
   (a) the material in the one connecting side wall is moved toward the other connecting side wall without significant compression of any of the material of the channel-shaped part by a rolling action of the material in the one connecting side wall and in the adjacent part of the outer wall.

8. The improvement in the method according to claim 5 further characterized by:
   (a) maintaining at least part of the outer wall spaced from the side wall of the hollow member during movement of the one connecting side wall to form a chime having a hollow interior.

9. The improvement in the method according to claim 8 characterized in that:
   (a) the wall material of the hollow member and the channel-shaped part immediately after the blow molding operation has a thickness varying from a minimum to a maximum as measured at different points about its circumference; and
   (b) the material of the channel-shaped part greater than the minimum thickness is directed into the hollow interior of the chime during its formation to produce a chime having an outer shape and size which is constant about the entire circumference of the hollow member.

10. The improvement in the method according to claim 8 further characterized by:
    (a) forming radially inwardly directed indentations in the outer side wall of the chime.

11. The improvement in the method according to claim 8 further characterized by:
    (a) forming axially directed indentations in the one connecting side wall of the chime.

12. The improvement in the method according to claim 8 further characterized by:
    (a) cutting off the outer wall of the chime.

13. The improvement in the method according to claim 8 further characterized by:
    (a) forming the chime adjacent one end of the hollow member with one of the connecting side walls radially aligned with said one end of the hollow member; and
    (b) cutting off said connecting side wall together with the adjacent end of the hollow member for insertion of a separate cover.

* * * * *